United States Patent
Chu et al.

(10) Patent No.: US 7,522,926 B2
(45) Date of Patent: Apr. 21, 2009

(54) LOCATION IDENTIFICATION

(75) Inventors: Heng Chu, Chapel Hill, NC (US); Ling Zhang, Shanghai (CN); Ting Yong Zhu, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 495 days.

(21) Appl. No.: 11/284,115

(22) Filed: Nov. 21, 2005

(65) Prior Publication Data

US 2006/0114145 A1 Jun. 1, 2006

(30) Foreign Application Priority Data

Nov. 26, 2004 (CN) ................... 2004 1 0096135

(51) Int. Cl.
*G01S 13/08* (2006.01)
(52) U.S. Cl. ................... 455/456.1; 342/118
(58) Field of Classification Search ....... 455/41.2–41.3, 455/404.2, 456.1–457; 701/207, 213, 216; 342/357.01–357.1
See application file for complete search history.

(56) References Cited

U.S. PATENT DOCUMENTS

| | | | |
|---|---|---|---|
| 5,396,644 A * | 3/1995 | Tzidon et al. ............... 370/337 |
| 5,929,848 A | 7/1999 | Albukerk et al. ............ 345/326 |
| 6,600,418 B2 | 7/2003 | Francis et al. ............. 340/572.1 |
| 6,687,609 B2 | 2/2004 | Hsiao et al. ................. 701/207 |
| 7,242,947 B2 * | 7/2007 | Niu et al. ................. 455/456.1 |
| 2002/0145534 A1 | 10/2002 | Dempsey ............... 340/825.49 |
| 2002/0170969 A1 | 11/2002 | Bridgelall .............. 235/462.13 |
| 2002/0198986 A1 | 12/2002 | Dempsey .................... 709/224 |
| 2003/0014186 A1 | 1/2003 | Adams, Jr. et al. |
| 2003/0080901 A1 | 5/2003 | Piotrowski .................. 342/386 |
| 2003/0100315 A1 | 5/2003 | Rankin ..................... 455/456.3 |
| 2003/0112126 A1 | 6/2003 | Kubler et al. ............ 340/10.33 |
| 2004/0000997 A1 | 1/2004 | Stevens ................... 340/572.1 |
| 2004/0061646 A1 | 4/2004 | Andrews et al. ............. 342/463 |
| 2004/0070515 A1 | 4/2004 | Burkley et al. ......... 340/825.49 |
| 2004/0078151 A1 | 4/2004 | Aljadeff et al. .............. 702/40 |
| 2005/0177446 A1 | 8/2005 | Hoblit ......................... 705/26 |
| 2005/0245271 A1 | 11/2005 | Vesuna .................... 455/456.1 |
| 2006/0022038 A1 * | 2/2006 | Hewlin et al. ............... 235/385 |

FOREIGN PATENT DOCUMENTS

JP 2004046904 A1 2/2004

* cited by examiner

*Primary Examiner*—Sam Bhattacharya
(74) *Attorney, Agent, or Firm*—Stephen A. Calogero, Esq.; Steven M. Greenberg, Esq.; Carey Rodriguez Greenberg & Paul LLP

(57) ABSTRACT

The location of a mobile terminal may be determined in response to signals received from a plurality of RFIDs. Information from a plurality of RFIDs for determining a location of a mobile terminal is received by the mobile terminal. The mobile terminal may maintain an in-range list that comprises all the RFIDs in which the mobile terminal is currently within their coverage range. The location of the mobile terminal is calculated in response to the received information for determining a location by calculating the common coverage area of the RFIDs in the in-range list.

3 Claims, 7 Drawing Sheets

LOCATION IDENTIFICATION

BACKGROUND OF THE INVENTION

The present invention relates to identifying the location of a mobile terminal, and more particularly, to identifying the location employing radio frequency identification (RFID) and providing location-based services.

At present, location-based service (LBS) is a new type of value-added service which requires: 1) identify location of the user requesting the service; and 2) provide service that is specific to the user location. Location-based service has various contents, such as advertisement for nearby merchants, driving direction instruction, etc. Consequently, the location identification technology is the foundation and key to provide location-based services.

Global Positioning System (GPS) is one type of location identification technology. GSM based location identification is another type of location identification technology. When the location of a mobile phone changes, its signal will switch from one base station to another. Thus, the location of the mobile phone can be determined according to the location of the signal's current base station. However, each base station may cover a working area of hundreds of meters, so the location identified is less precise than that of GPS.

BRIEF SUMMARY OF THE INVENTION

According to a one aspect of the present invention, a method for location identification comprises receiving information from a plurality of RFIDs for determining a location of a mobile terminal, maintaining an in-range list that comprises all the RFIDs in which the mobile terminal is currently within their coverage range, and calculating the location of the mobile terminal in response to the received information for determining a location by calculating the common coverage area of the RFIDs in the in-range list.

According to another aspect of the present invention, a mobile terminal comprises a RFID reader for receiving information for determining a location from a plurality of RFIDs, a location determination module for determining he mobile terminal's location according to the information for determining a location from the plurality of RFIDs. The location determination module comprises an in-range list maintaining unit for maintaining an in-range list that comprises all the RFIDs that the mobile terminal is currently within their coverage range and an intersection range calculating unit for calculating the common coverage range of the RFIDs in said in-range list.

According to yet another aspect of the present invention, a RFID structure comprises a plurality of sub-RFIDs, each sub-RFID is used to store and transmit one information segment, and a main RFID for storing and transmitting the information representing the sequence of the information segments stored in the plurality of sub-RFIDs.

According a still further aspect of the present invention, a computer program product for location determination comprises a computer usable medium having computer useable program code embodied therein. The computer useable program code comprises computer usable program code configured to receive information from a plurality of RFIDs for determining a location of a mobile terminal, computer usable program code configured to maintain an in-range list that comprises all the RFIDs in which the mobile terminal is currently within their coverage range, and computer usable program code configured to calculate the location of the mobile terminal in response to the received information for determining a location by calculating the common coverage area of said RFIDs in said in-range list.

Other aspects and features of the present invention, as defined solely by the claims, will become apparent to those ordinarily skilled in the art upon review of the following non-limited detailed description of the invention in conjunction with the accompanying figures.

DETAILED DESCRIPTION OF THE INVENTION

Figure 1:
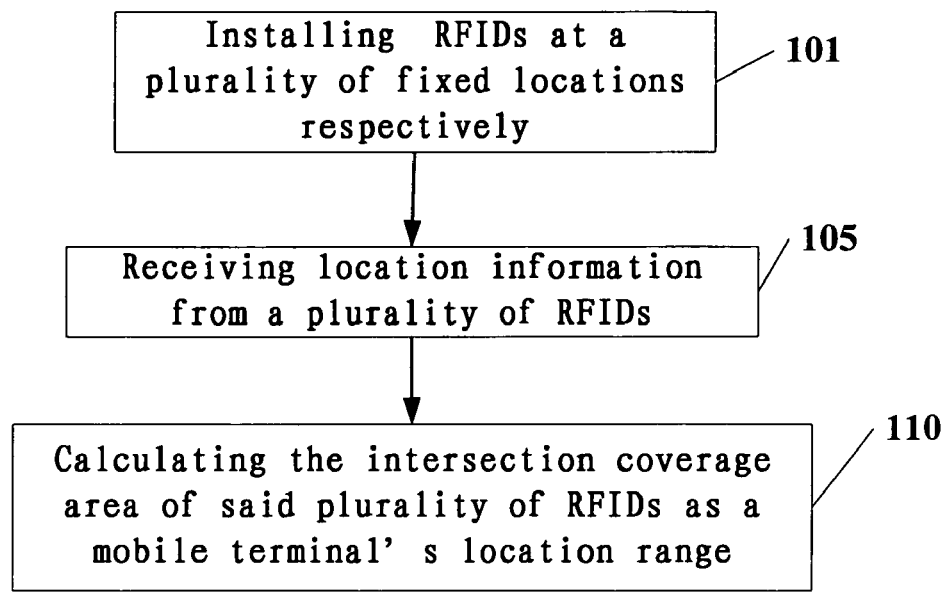
FIG. 1 is a flowchart of the method for location identification according to one embodiment of the present invention.

As will be appreciated by one of skill in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects all generally referred to herein as a "circuit" or "module." Furthermore, the present invention may take the form of a computer program product on a computer-usable storage medium having computer-usable program code embodied in the medium.

Any suitable computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-usable or computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable or computer-readable medium may include a computer data signal embodied in a carrier wave.

Computer program code for carrying out operations of the present invention may be written in an object oriented programming language such as Java7, Smalltalk or C++. However, the computer program code for carrying out operations of the present invention may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 is a flowchart of the method for location identification according to one embodiment of the present invention. As shown in FIG. 1, first at Step 101, RFIDs are installed at a plurality of fixed locations respectively. As is known to those skilled in the art, radio frequency identification (RFID) is a device that transmits identification and/or other information around certain range in the form of radio frequency. It can be implemented in the form of a contactless IC card, for example. Of course, the RFID may be active or passive and the present invention has no limitation to this. In the present embodiment, a plurality of RFIDs may be installed at different fixed locations respectively, each RFID stores therein the code that uniquely identifies that RFID and the information for determining a location, such as the information representing the location of that RFID (for example, longitude, latitude and altitude etc.) and information of the coverage area of that RFID. The information is transmitted in the form of radio frequency by the RFID. The RFIDs may be installed in a way that the RFIDs will have overlap coverage areas with each other.

Next, at Step 105, a user with a mobile terminal in his hand moves in an area where the RFIDs have been installed, and the mobile terminal receives signals transmitted from said RFIDs. In particular, when the mobile terminal enters the coverage area of the signal of the RFID installed at a fixed location, the code and the information for determining a location from that RFID could be received. Next, at Step 110, the mobile terminal calculates the intersection of the coverage area of two or more RFIDs from which signals can be received as the location range of that mobile terminal. It will be appreciated by those skilled in the art that the mobile terminal described herein may take any conventional form and operate on any cellular system. For example, the mobile terminal may comprise, in a portable housing, a keyboard/keypad, a display, a speaker, a microphone, a transceiver, and a memory that communicate with a controller. The network upon which the mobile terminal operate may be, for example, code division multiple access (CDMA), time division multiple access (TDMA), Global System for Mobile Communication (GSM), General Packet Radio Service (GPRS), Integrated Digital Enhanced Net (iDEN), Cellular Digital Packet Data (CDPD), J Phone, KDDI, Wideband Code Division Multiple Access (WCDMA) and Universal Mobile Telecommunications System (UMTS) network or the like.

Figure 2:
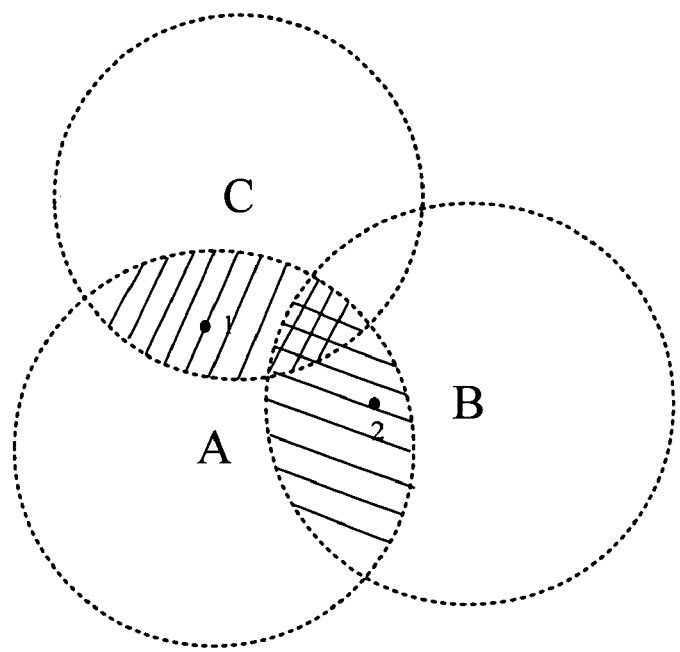
FIG. 2 is an application diagram of the method for location identification of the embodiment shown in FIG. 1.

FIG. 2 is an application diagram for illustrating the method for location identification of the present embodiment. As is shown, the coverage areas of three RFIDs A, B and C intersect with each other. The signals from RFIDs A and C can be received when a mobile terminal is in location 1, according to the method of the present embodiment, it can be determined that the mobile terminal is within the common (intersection) coverage area (the oblique line area) of the RFIDs A and C. The signals from RFIDs A and B can be received when a mobile terminal is in location 2, according to the method of the present embodiment, it can be determined that the mobile terminal is within the common coverage area (the backlash area) of the RFIDs A and B. The signals from RFIDs A, B and C can be received when a mobile terminal is in location 3, according to the method of the present embodiment, it can be determined that the mobile terminal is within the common coverage area (the graticule area) of the RFIDs A, B and C.

From the above description it can be seen that, in the present embodiment, by setting relatively large coverage area of a RFID, and also by installing RFIDs in a way that the coverage areas of RFIDs intersect with each other and determining a location by utilizing the common coverage area of the RFIDs, vacancy in coverage areas of the RFIDs can be avoided, that is, the state in which a mobile terminal can not be located can be avoided, and thereby comprehensive and accurate localization can be achieved.

Figure 3:
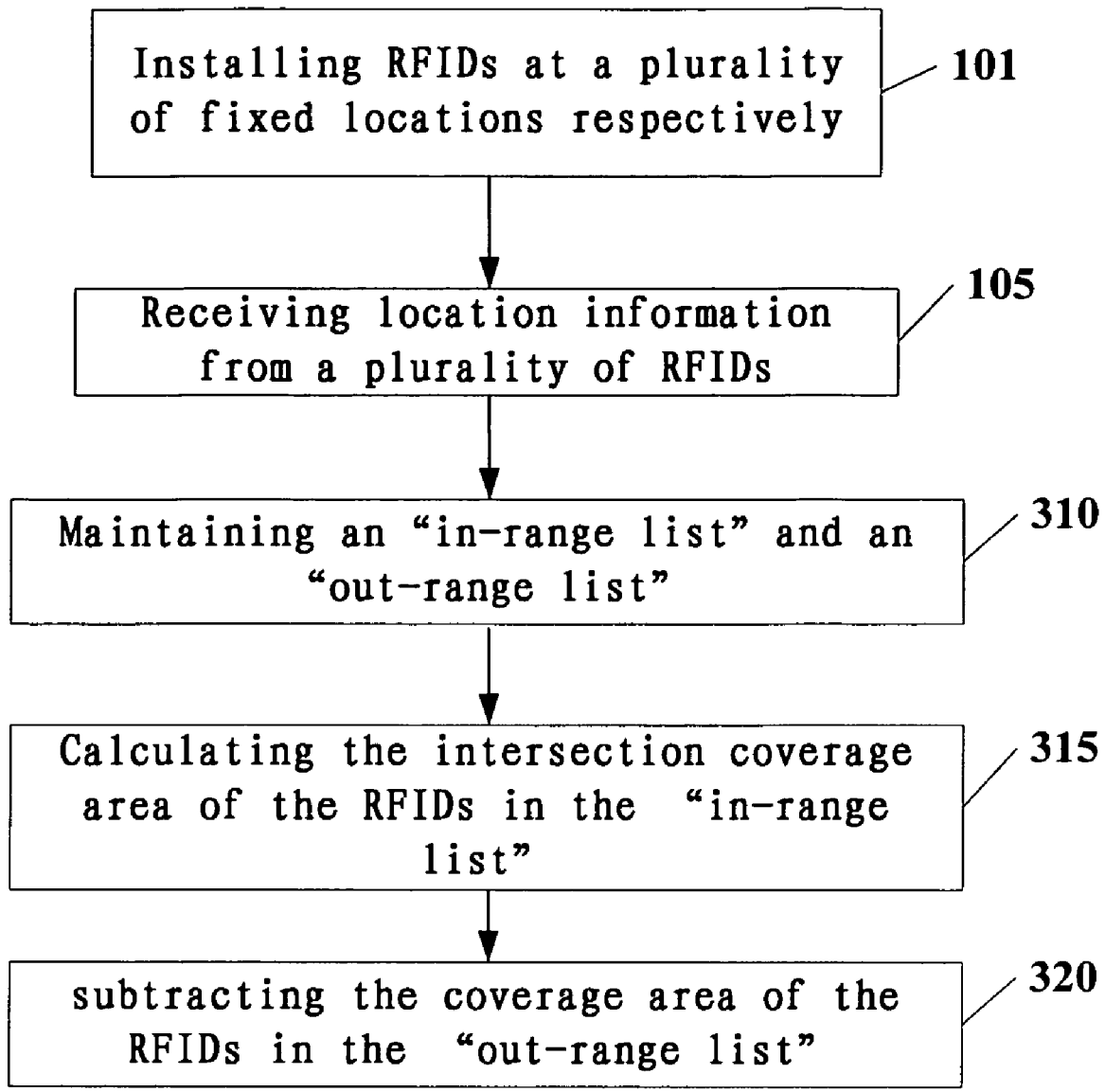
FIG. 3 is a flowchart of the method for location identification according to another embodiment of the present invention.

FIG. 3 is a flowchart of the method for location identification according to another embodiment of the present invention. As shown in FIG. 3, the beginning Step 101 and 105 in the present embodiment is the same as those in the above embodiment. Next, at Step 310, an "in-range list" and an "out-range list" are maintained on a mobile terminal.

Wherein, all the RFIDs that the mobile terminal is currently within their coverage range are recorded in the "in-range list"; and the RFIDs that the mobile terminal is currently out of their coverage range are recorded in the "out-range list".

In particular, according to the present embodiment, when the mobile terminal moves and it enters into the coverage range of a new RFID, the mobile terminal will receive the signal from the new RFID. At this time, the mobile terminal determines whether the RFID is recorded in the "in-range list", if no, the RFID will be added to the "in-range list"; in addition, the mobile terminal also determines whether the RFID is recorded in the "out-range list", if yes, the RFID will be removed from the "out-range list".

On the other hand, when the mobile terminal moves and leaves the coverage area of a RFID, the mobile terminal will not receive the signal of the RFID. At this time, the mobile terminal determines whether the RFID is recorded in the "in-range list", if yes, the RFID will be removed from the "in-range list"; in addition, the mobile terminal also determines whether the RFID is recorded in the "out-range list", if no, the RFID will be added to the "out-range list".

Thus, it can be maintained that the "in-range list" will always record those RFIDs that the mobile terminal is currently within their coverage range, while the "out-range list" will record those RFIDs that the mobile terminal had entered but has been out of their coverage range.

Next, at Step 315, the common coverage area of the respective RFIDs in the "in-range list" will be calculated. Then, at Step 320, the coverage range of the respective RFIDs in the "out-range list" will be subtracted from the common coverage range calculated at Step 315 and the resulting area will be taken as the current location range of the mobile terminal.

Figure 4A:
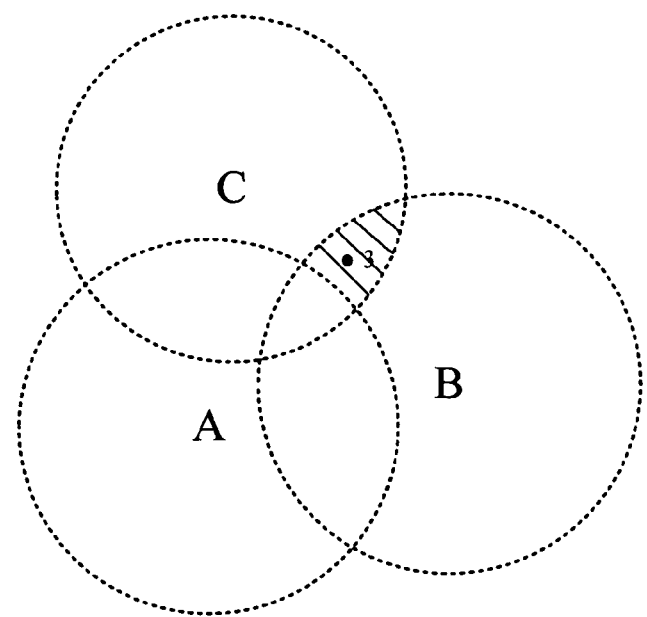
FIGS. 4A and B is an application diagram of the method for location identification of the embodiment of the present invention.

FIG. 4A is an application diagram of the method for location identification of the present embodiment. As shown in FIG. 4A, assuming that after passing the coverage range of RFIDs A and B, a mobile terminal comes to location 3, which is within the intersection range of RFIDs B and C. At this time, in accordance with the method of the present embodiment, RFIDs B and C are recorded in the "in-range list" and RFID A is recorded in the "out-range list" of the mobile terminal. Accordingly, it can be determined that the mobile terminal is within an area that subtracts the coverage range of RFID A from the common coverage range of RFIDs B and C (the oblique line area).

From the above description it can be seen that, in the present embodiment, by excluding the coverage range of a left RFID from the common coverage range, the current location range can be further determined accurately.

Further, according to one variation of the present embodiment, each RFID also stores therein the location and coverage range information of nearby RFIDs and the information is also transmitted via radio frequency signals. Correspondingly, when a mobile terminal enters the coverage range of a new RFID, besides to receive the location and coverage range information of that new RFID, the mobile terminal also receives the location and coverage range information of nearby RFIDs. At this time, the mobile terminal determines whether the RFID is recorded in the "in-range list", if no, the RFID will be added to the "in-range list"; in addition, the mobile terminal also determines whether said neighboring RFIDs are recorded in the "out-range list", if no, said neighboring RFIDs will be added to the "out-range list".

In this way, a mobile terminal can not only exclude the coverage range of those RFIDs from which signals have been received and from which the terminal have left from the common coverage range of the RFIDs from which signals are being received, but also further exclude the coverage range of those RFIDs which are neighboring and from which signals have never been received. Moreover, even if the mobile terminal can only receive one RFID's signal, the location range can also be determined accurately.

Figure 4B:
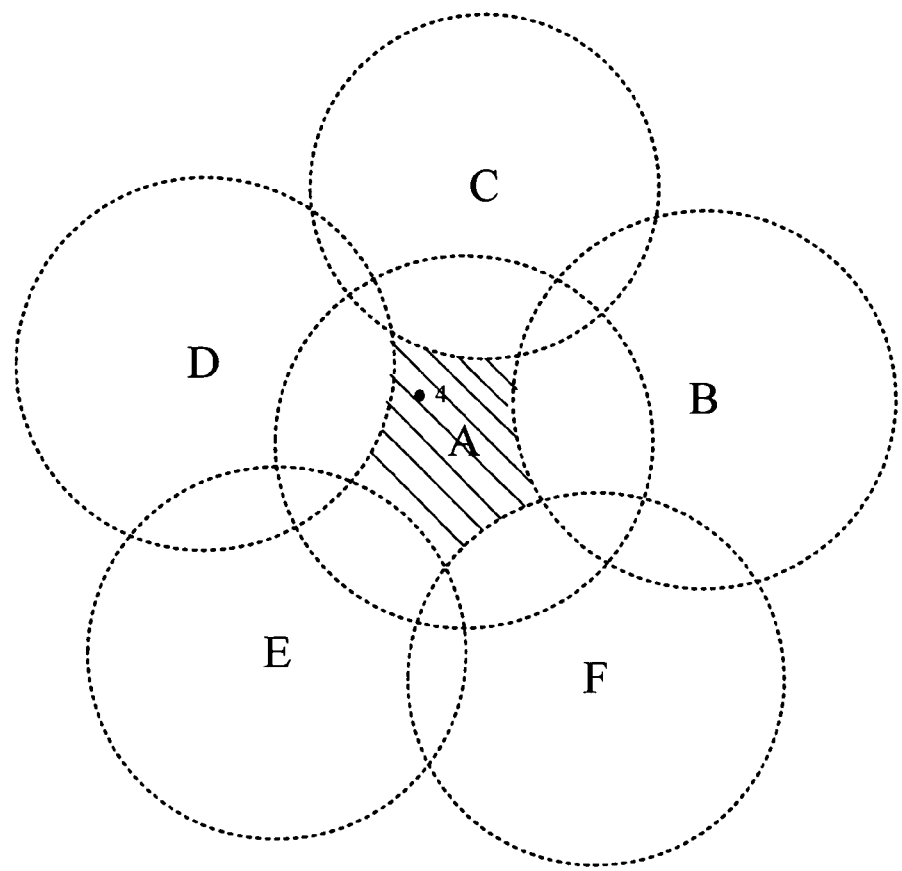

FIG. 4B shows an application diagram according to the method for location identification of the present variation. As shown in FIG. 4B, in case that a mobile terminal is in location 4 and can only receive signal from RFID A, because besides the location and coverage range information of that RFID A, the mobile terminal also receives the location and coverage range information of neighboring RFIDs (B, C, D, E and F in the FIG.). Accordingly, the mobile terminal can subtract the coverage range of the above neighboring RFIDs from the coverage range of RFID A, thereby the location range (namely, the oblique line area in the FIG.) of the terminal can be achieved.

In addition, the above-described method for location identification of the various embodiments can further provide location-based services for a mobile terminal. In particular, location-based service information is stored in a RFID, the mobile terminal can receive the service information from the RFID and provide location-based service for a user based on the location of the terminal.

Figure 5:
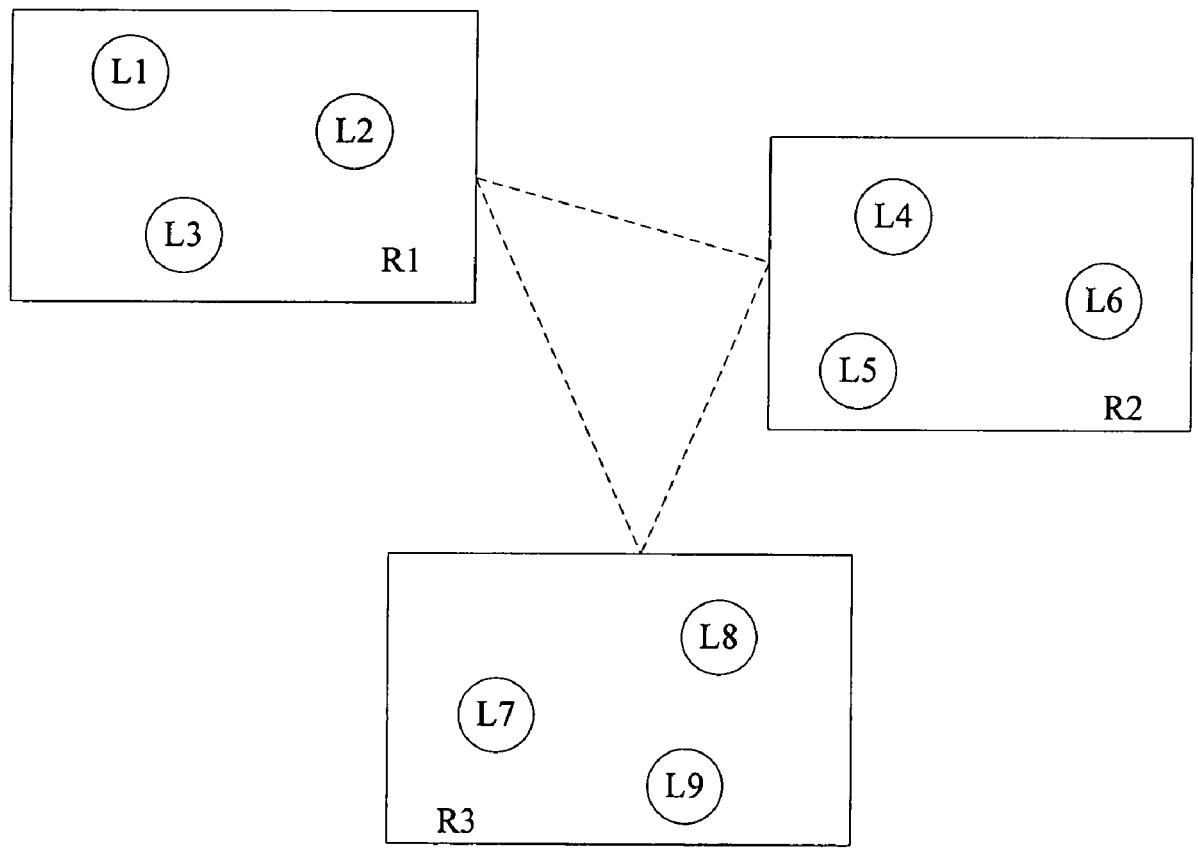
FIG. 5 is a diagram of the embodiment that applies the method for location identification of the embodiment of the present invention to the direction instruction and navigation services in a museum.

Next it will be described with examples, FIG. 5 is a diagram of the embodiment that applies the method for location identification of the above embodiments to the direction instruction and navigation services in a museum. RFIDs are installed at fixed locations in the museum so that the whole region of the museum is covered by the signals of the RFIDs, for example, nine RFIDs L1-L9 are installed at fixed locations in the museum. The whole region of the museum is divided into several small regions, for example, three regions R1-R3, and there are multiple RFIDs in each region, that is, RFIDs L1, L2 and L3 in region R1, RFIDs L4, L5 and L6 in region R2, and RFIDs L7, L8 and L9 in region R3. Thus, relative to each RFID, other RFIDs are divided into two categories: the RFIDs in a same region and the RFIDs in a different region. Then the location information transmitted by each RFID contains: the location and location-based service information of present RFID; the location-based service information of a same region; the location-based service information of a different region; wherein the location of present RFID comprises the present RFID's identification number, longitude, latitude and signal's coverage range. Take the RFID L1 in region R1 as an example to illustrate the location information transmitted by a RFID, wherein the location of the RFID L1 is represented as "L1: longitude/latitude/signal's coverage range"; the location-based service information of a same region is used to introduce the exhibit at locations of other RFIDs in the same region and to instruct the route to that RFID, for example, the information "Vinci, Mona.Lisa: L2; N15, E20" represents that at RFID L2 in region R1 is the portrait of Mona.Lisa by Vinci, and the route from RFID L1 to RFID L2 is "N15, E20"; the location-based service information of a different region is used to introduce the exhibit in a different region and to instruct the route to that region, for example, the information "Treasure: R2; N30, E20" represents that in region R2 is a treasure exhibition, and the route from RFID L1 to region R2 is "N30, E20". When a user wants to obtain the direction instruction to a location, he/she may enter a keyword, the mobile terminal will search in the received location information to find the matching information, if find, the information will be presented to the user. If the matching information found shows that the location the user wants to go is within another region, the user first reaches that region based on the matching information, and then further obtains more detailed instruction information.

In addition, the location-based service information can also be prestored in a mobile terminal. When the mobile terminal has determined the current location, it retrieves the service information corresponding to the current location and provides it for the user.

In the above embodiments, the location information and the location-based service information may be one of or a combination of text, audio and image.

From the above description it can be seen that not only the current location of a mobile terminal can be determined, but also the location-based service functions can be implemented by employing the method for location identification of the present embodiment.

Figure 6:
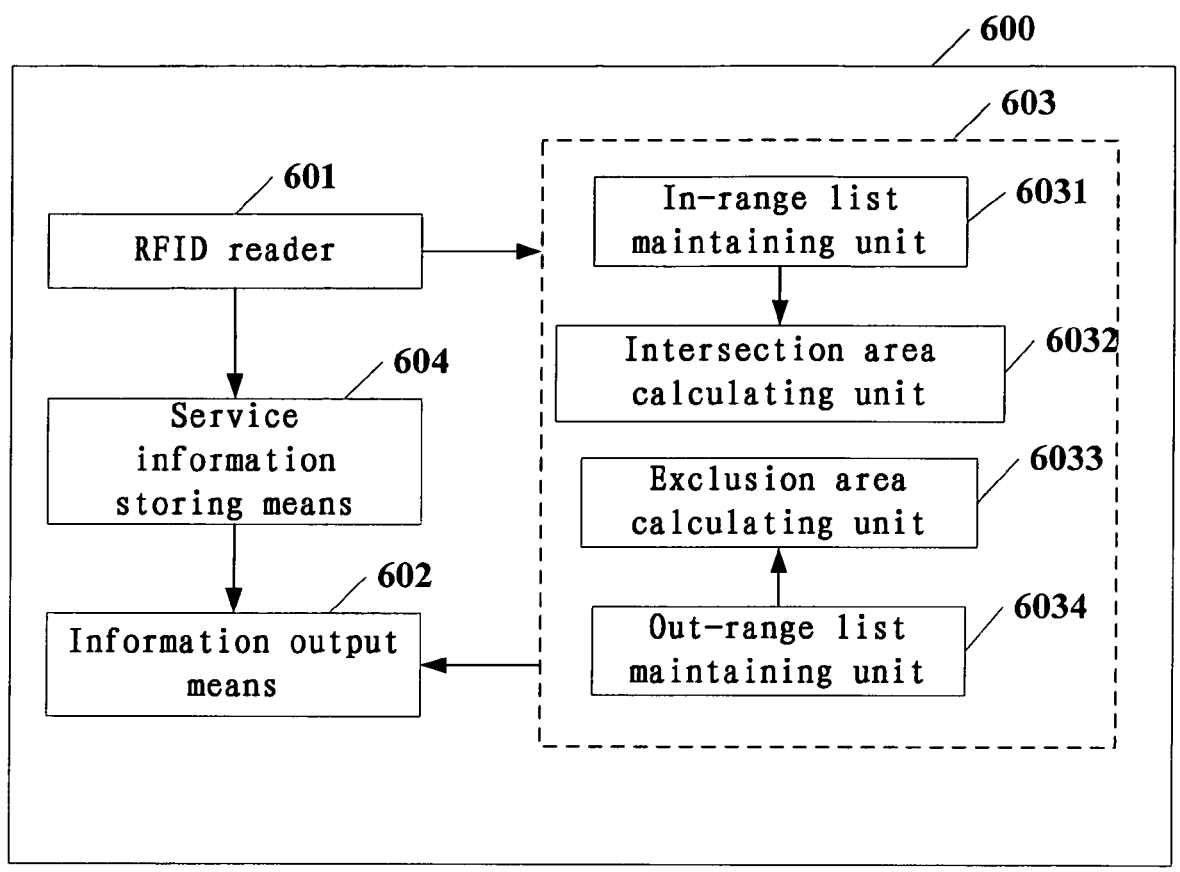
FIG. 6 is a block diagram that shows a mobile terminal for location identification according to one embodiment of the present invention.

The present invention also provides a mobile terminal for location identification. FIG. 6 is a block diagram that shows a mobile terminal for location identification according to one embodiment of the present invention. As shown in FIG. 6, the mobile terminal 600 for location identification of the present embodiment comprises: a RFID reader 601 for receiving the information for determining a location from RFIDs, in particular, receiving RF signals from RFIDs and demodulating them to obtain the information in them, such as location, coverage range etc.; a location determination means 603 for determining the location of said mobile terminal according to said information for determining a location from RFIDs; an information output means 602 for outputting the information of said determined location to a user, for example, by way of displaying text, image and outputting voice etc.

Wherein, the location determination means 603 further comprises: an in-range list maintaining unit 6031 for maintaining an "in-range list", in which the RFIDs that said mobile terminal 600 is currently within their coverage range are recorded; an intersection range calculating unit 6032 for calculating the common coverage range of the RFIDs in the "in-range list"; an out-range list maintaining unit 6034 for maintaining an "out-range list", in which the RFIDs that said mobile terminal is currently out of their coverage range are recorded; and an exclusion range calculating unit 6033 for subtracting the coverage range of each RFID in the "out-range list" from the common coverage range calculated by the intersection range calculating unit 6032.

Further, when there is location-based service information stored in the RFIDs, the RFID reader 601 further receives the location-based service information from the RFIDs. In case that the service information needs to be prestored in the mobile terminal 600, the mobile terminal 600 may further comprises: a service information storing unit 604 for storing the location-based service information. In addition, the information output means 602 also outputs location-based service information to a user.

The mobile terminal 600 for location identification of the present embodiment can operationally implement the method for location identification described in the above embodiments.

Various of the foregoing components of the mobile terminal 600, other than those described further herein, may be included in many conventional mobile terminals and their functionality is generally known to those skilled in the art. It should be further understood, that, as used herein, the term "mobile terminal" may include a cellular radiotelephone with or without a multi-line display; a Personal Communications System (PCS) terminal that may combine a cellular radiotelephone with data processing, facsimile and data communications capabilities; a Personal Data Assistant (PDA) that can include a radiotelephone, pager, Internet/intranet access, Web browser, organizer, calendar and/or a global positioning system (GPS) receiver; and a conventional laptop and/or palmtop receiver or other appliance that includes a radiotelephone transceiver. Mobile terminals may also be referred to as "pervasive computing" devices.

Since the storage capability of a RFID is limited, when there are more data to be stored in the RFID, for example, the amount of the service information is large, better services and more powerful functions always could not be provided.

Figure 7:
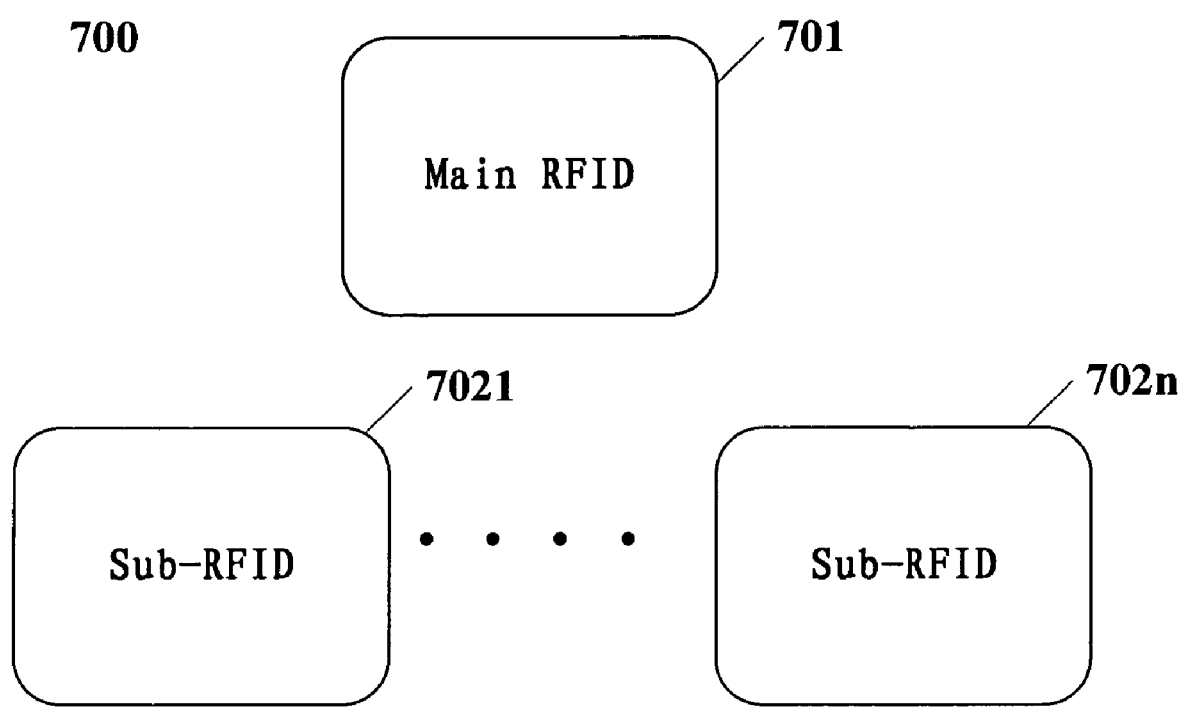
FIG. 7 is a diagram of a RFID structure according to one embodiment of the present invention.

FIG. 7 is a diagram that shows a RFID structure according to one embodiment of the present invention. As shown in FIG. 7, a RFID structure 700 comprises: one main RFID 701 and a plurality of sub-RFIDs 7021-702n. Wherein, each sub-RFIDs 7021-702n stores therein one information segment, and the main RFID 701 stores therein the information representing the sequence of respective information segments stored in the sub-RFIDs 7021-702n. Thus, large data can be divided and stored in multiple sub-RFIDs and can be recombined together by the sequence information in the main RFID.

Further, the RFID structure of the present embodiment can be applied to the above embodiments. For example, the RFID structure of the present embodiment can replace the RFID in the above embodiments. Each sub-RFIDs 7021-702n stores therein one segment of the location-based service information; and the main RFID 701 stores therein the information representing the sequence of the respective information segments in the sub-RFIDs 7021-702n and the information for determining a location. Thus, richer service information that does not be limited by the storage capability of a single RFID can be provided, for example, image, audio and even video service information can be provided.

The present embodiment will also allow a user to implement a simple RFID system to meet his current needs at low cost, and seamlessly upgrade the RFID system later by adding additional RFIDs. In the circumstance that different information provider may want to provide part of the information individually or independently, then every information provider might use a RFID tag with RFID structure of the present embodiment. The RFID data structure of every RFID tag has same main RFID and different sub-RFID. With the information in main RFID, the sub-RFIDs are organized to provide one complete information. A user does not have to replace a RFID tag in a location in order to upgrade the information system. The user can add a second RFID to the location for additional information storage.

Figure 8:
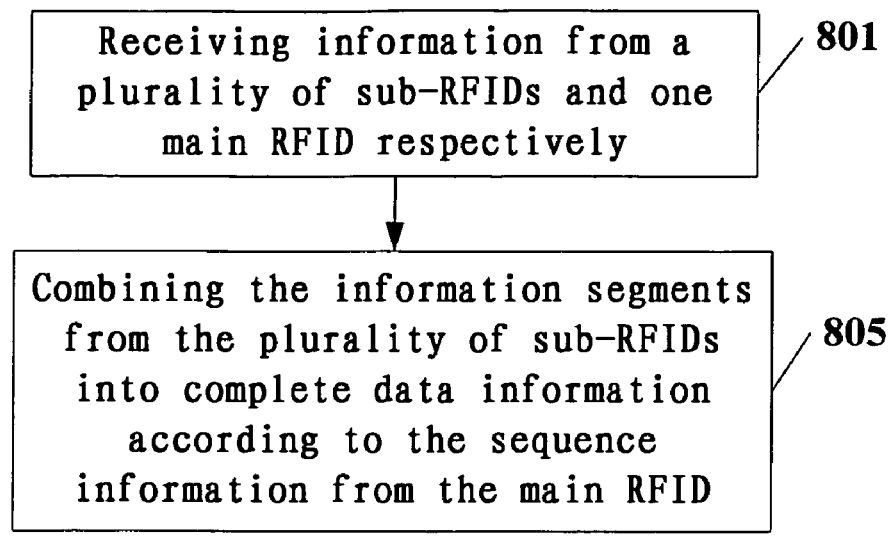
FIG. 8 is a flowchart of the method for receiving data from the RFID structure according to one embodiment of the present invention.

The present invention also provides a method for receiving data from the RFID structure, that is, a method for receiving data from the RFID structure 700 described in the above embodiment that comprises one main RFID 701 and a plurality of sub-RFIDs 7021-702n. FIG. 8 is a flowchart of the method for receiving data from a RFID structure according to one embodiment of the present invention.

As shown in FIG. 8, first at Step 801, information is received from a plurality of sub-RFIDs and one main RFID respectively. As above-mentioned, in the RFID structure, each sub-RFIDs 7021-702n stores therein one information segment, the main RFID 701 stores therein the information representing the sequence of the respective information segments stored in the sub-RFIDs 7021-702n. The present step receives (reads) this information respectively.

Next, at Step 805, the information segments from said plurality of sub-RFIDs 7021-702n are combined into complete information according to the sequence information from the main RFID 701.

Thus, the information segments stored dispersedly can be received from the RFID structure and be recovered into complete data by employing the method of the present embodiment.

Figure 9:
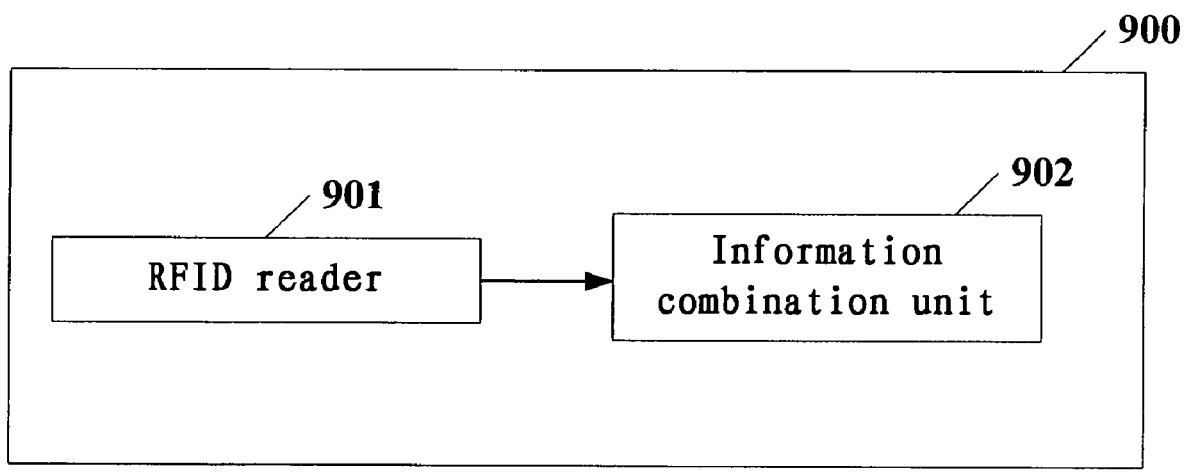
FIG. 9 is a block diagram that shows an apparatus for receiving data from the RFID structure according to one embodiment of the present invention.

The present invention also provides an apparatus for receiving data from the RFID structure, that is, an apparatus for receiving data from the RFID structure 700 described above that comprises one main RFID 701 and a plurality of sub-RFIDs 7021-702n. FIG. 9 is a block diagram that shows an apparatus for receiving data from the RFID structure according to one embodiment of the present invention.

As shown in FIG. 9, the apparatus 900 for receiving data from the RFID structure of the present embodiment comprises: a RFID reader 901 for receiving the information from the sub-RFIDs and the main RFID in the RFID structure. An information combination unit 902 for combining the information segments from the plurality of sub-RFIDs in the RFID structure into complete information according to the sequence information from the main RFID in the RFID structure.

Further, the apparatus 900 for receiving data from the RFID structure of the present embodiment can be applied to the above-described mobile terminal 600. In particular, the apparatus 900 for receiving data from the RFID structure of the present embodiment can replace the RFID reader 601 of the mobile terminal 600. Thus, the mobile terminal 600 also can receive large data from the RFID structure.

In addition, the present invention also provides a system for location identification. According to one embodiment of the invention, the system for location identification comprises: a plurality of RFIDs installed at a plurality of fixed locations respectively; and the mobile terminal for location identification described in the above embodiments.

Further, in a system for location identification according to another embodiment of the invention, at least one of said plurality of RFIDs comprises the above-described RFID structure, that is, it comprises one main RFID and a plurality of sub-RFIDs. Accordingly, the mobile terminal employs the mobile terminal that has applied the above-described means 900 for receiving data from the RFID structure, thereby it can receive data from the RFID structure.

Next, still take a museum as an example to illustrate the application of the system for location identification of the present embodiment. A RFID structure is installed at the entrance of the museum. All the location-based service information used by the museum is stored in the plurality of sub-RFIDs of said RFID structure, and the RFIDs at other locations will only store the information for determining a location. Thus, when a visitor enters the museum, his/her mobile terminal will receive service information from the RFID structure, and when the current location has been determined during visiting, the mobile terminal then can provide the current location information and the service information for the user.

It can be seen that a location could be determined accurately and rich location-based services could be provided for a user by utilizing the system for location identification of the present embodiment. In addition, the RFID structure can also be installed at the entrance to each floor respectively for transmitting the service information used by that floor to the mobile terminal, so that the requirement to the storage capacity of the mobile terminal can be reduced.

Although the method for location identification, the mobile terminal for location identification, the RFID structure, the method and apparatus for receiving data from the RFID structure and the system for location identification of the present invention has been described in detail with some illustrative embodiments in the above, these embodiments are not exhaustive, and various changes and modifications may be made by one skilled in the art within the spirit and scope of the invention. Accordingly, the invention is not limited to these embodiments, and the scope of the invention is only defined by the appended claims.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for location identification, comprising:
   receiving information from a plurality of RFIDs for determining a location of a mobile terminal;
   maintaining an in-range list that comprises all the RFIDs in which said mobile terminal is currently within their coverage range;
   calculating the location of the mobile terminal in response to said received information for determining a location by calculating the common coverage area of said RFIDs in said in-range list, wherein the information for determining a location from said RFID comprises the location information of said RFID and the coverage range information of said RFID;
   maintaining an out-range list that comprises a list of the RFIDs that said mobile terminal is currently out of their coverage range, wherein calculating said mobile terminal's location range comprises subtracting the coverage range of each RFID in said out-range list from the common coverage area of said RFIDs in said in-range list, and the information for determining a location from said RFID further comprises the location information of RFID's neighboring said RFIDs and said neighboring RFID's respective coverage range information;

adding a new RFID to said in-range list when said mobile terminal receives a signal from said RFID; and adding said neighboring RFIDs that are not present in the in-range list to said out-range list according to the information that comes from said RFID and that represents the location of said neighboring RFIDs and their respective coverage range.

2. A mobile terminal, comprising:

a RFID reader for receiving information for determining a location from a plurality of RFIDs;

a location determination module for determining said mobile terminal's location according to the information for determining a location from said plurality of RFIDs;

said location determination module comprising:

an in-range list maintaining unit for maintaining an in-range list that comprises all the RFIDs that said mobile terminal is currently within their coverage range; and an intersection range calculating unit for calculating a common coverage range of said RFIDs in said in-range list, wherein said location determination module farther comprises:

an out-range list maintaining unit for maintaining an out-range list that comprises all of the RFIDs that said mobile terminal is currently out of their coverage range, and an exclusion range calculating unit for subtracting the coverage range of each RFID in said out-range list from the common coverage range calculated by said intersection range calculating unit, said RFID reader farther receives location-based service information from said RFIDs, said mobile terminal farther comprises a service information storing means for storing said location-based service information, said plurality of RFIDs comprise:

a plurality of sub-RFIDs, each sub-RFID is used to store and transmit one information segment, and a main RFID for storing and transmitting the information representing the sequence of the information segments stored in said plurality of sub-RFIDs.

3. A computer usable medium having computer readable instructions embodied therein for location determination, the computer readable instructions, when executed on a computer system, causing the computer system to perform the operations comprising:

receiving information from a plurality of RFIDs for determining a location of a mobile terminal;

maintaining an in-range list that comprises all the RFIDs in which said mobile terminal is currently within their coverage range;

calculating the location of the mobile terminal in response to said received information for determining a location by calculating the common coverage area of said RFIDs in said in-range list, wherein the information for determining a location from said RFID comprises the location information of said RFID and the coverage range information of said RFID;

maintaining an out-range list that comprises a list of the RFIDs that said mobile terminal is currently out of their coverage range, wherein calculating said mobile terminal's location range comprises subtracting the coverage range of each RFID in said out-range list from the common coverage area of said RFIDs in said in-range list, and the information for determining a location from said RFID further comprises the location information of RFID's neighboring said RFIDs and said neighboring RFID's respective coverage range information;

adding a new RFID to said in-range list when said mobile terminal receives a signal from said RFID; and adding said neighboring RFIDs that are not present in the in-range list to said out-range list according to the information that comes from said RFID and that represents the location of said neighboring RFIDs and their respective coverage range.

* * * * *